M. F. BAYER.
HANDLING APPARATUS.
APPLICATION FILED DEC. 26, 1917.
1,340,648.
Patented May 18, 1920.
10 SHEETS—SHEET 3.
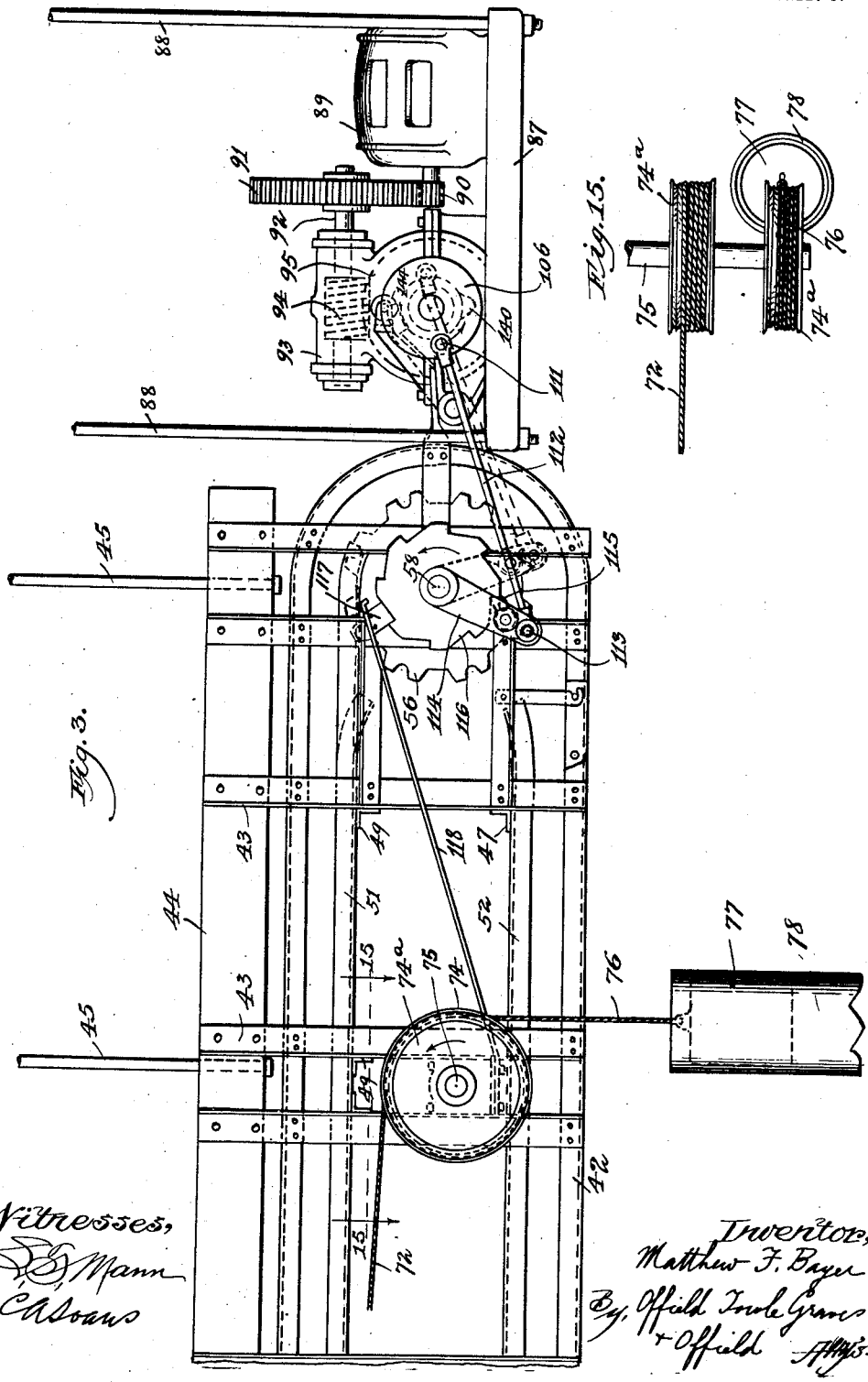

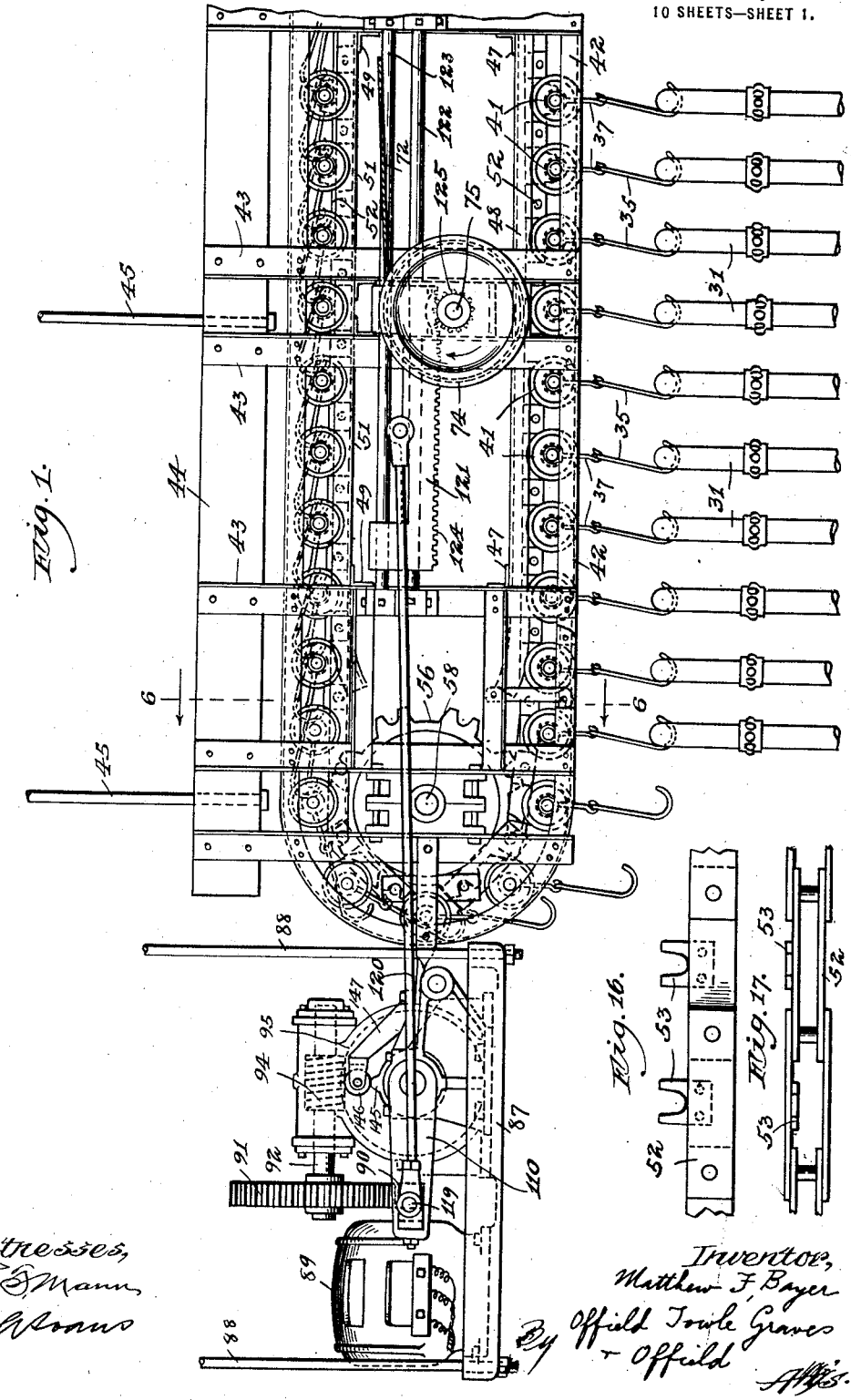

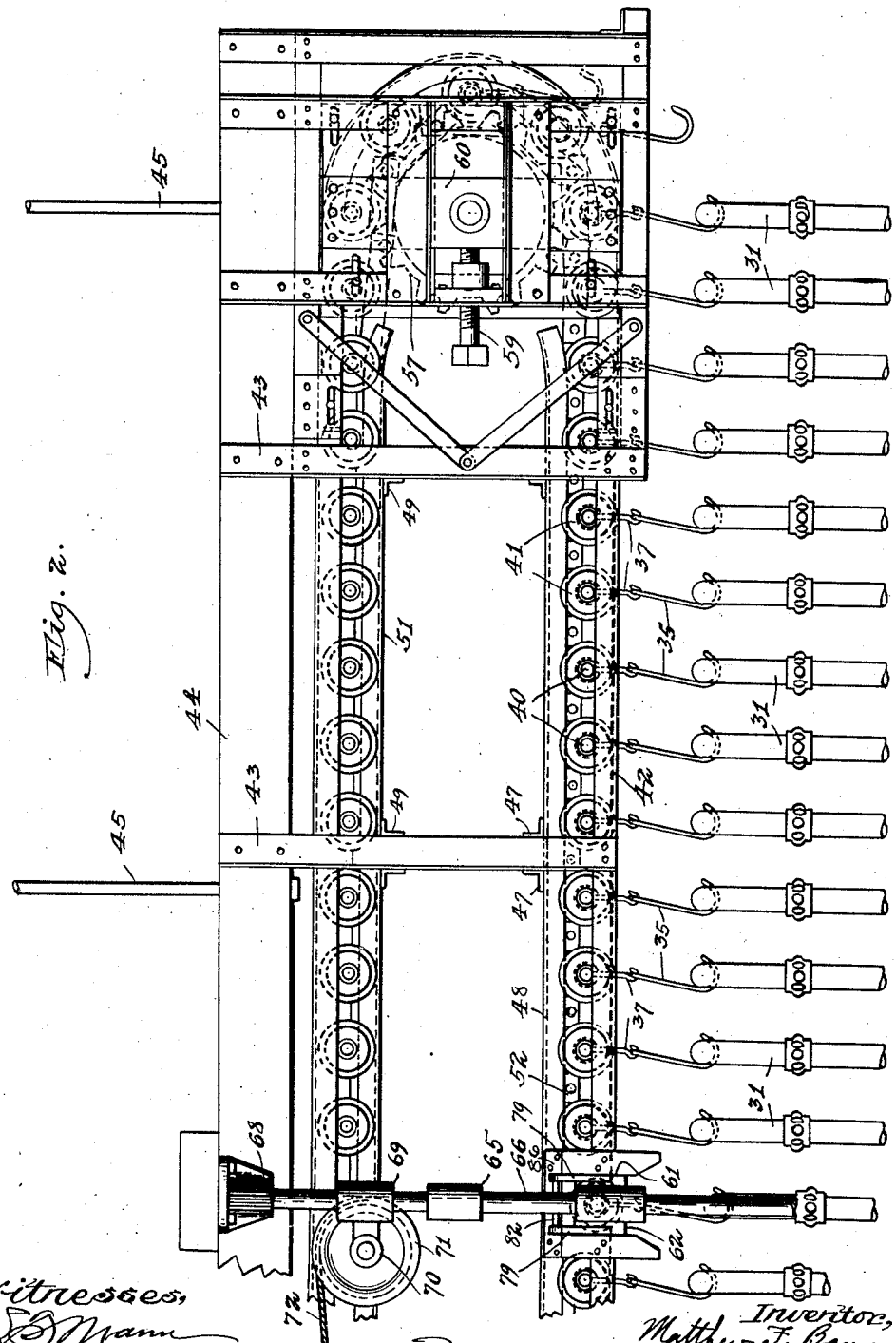

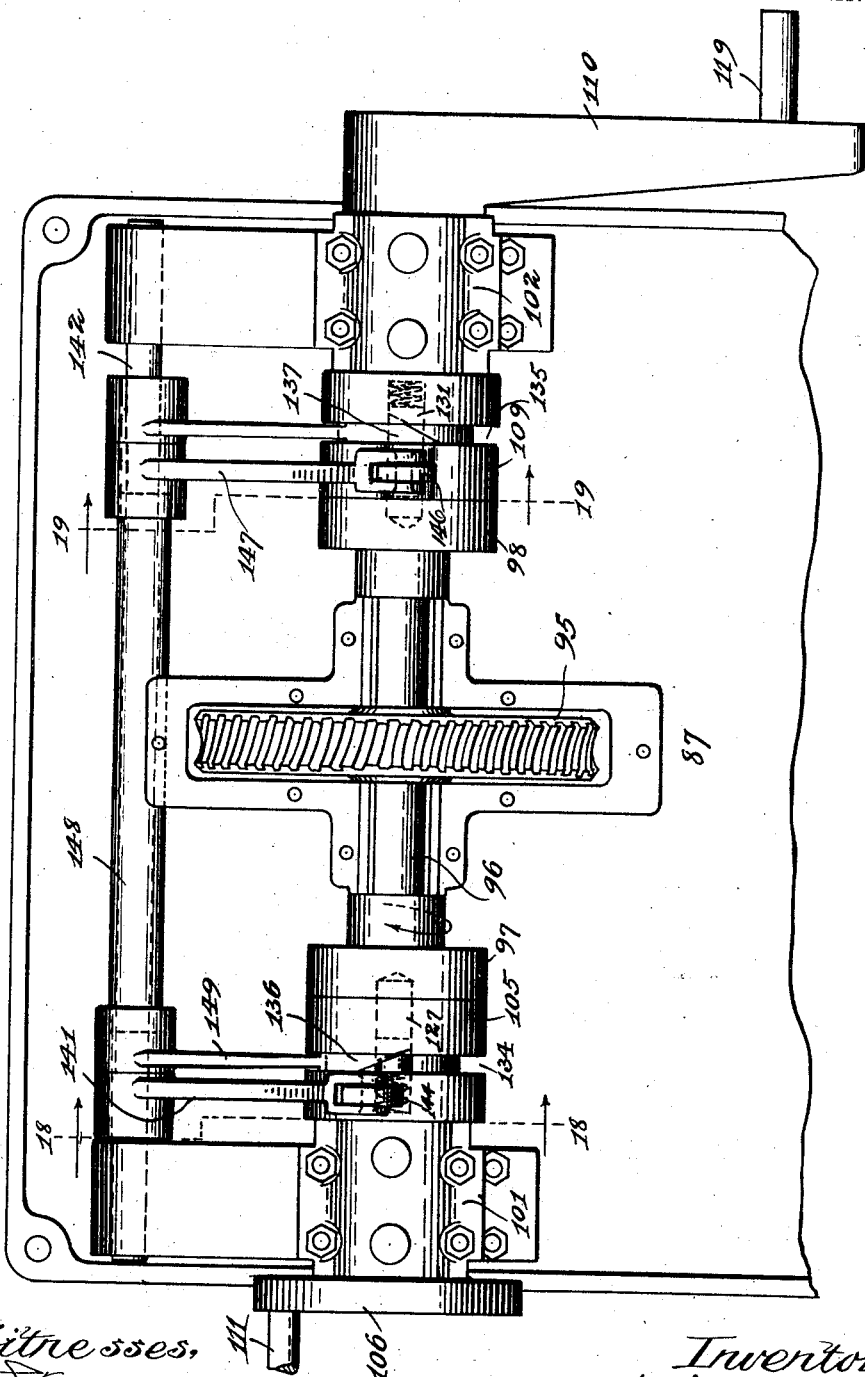

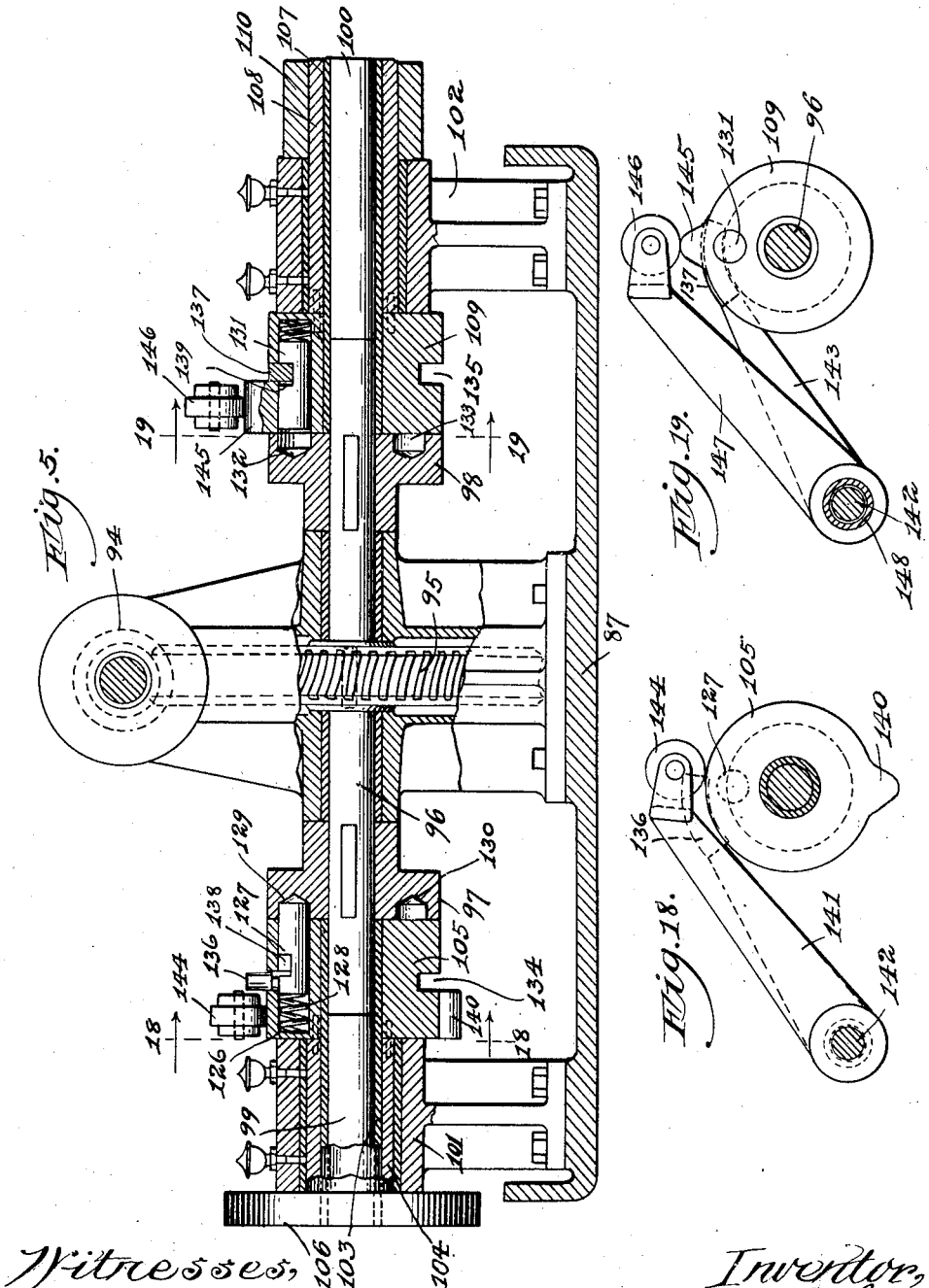

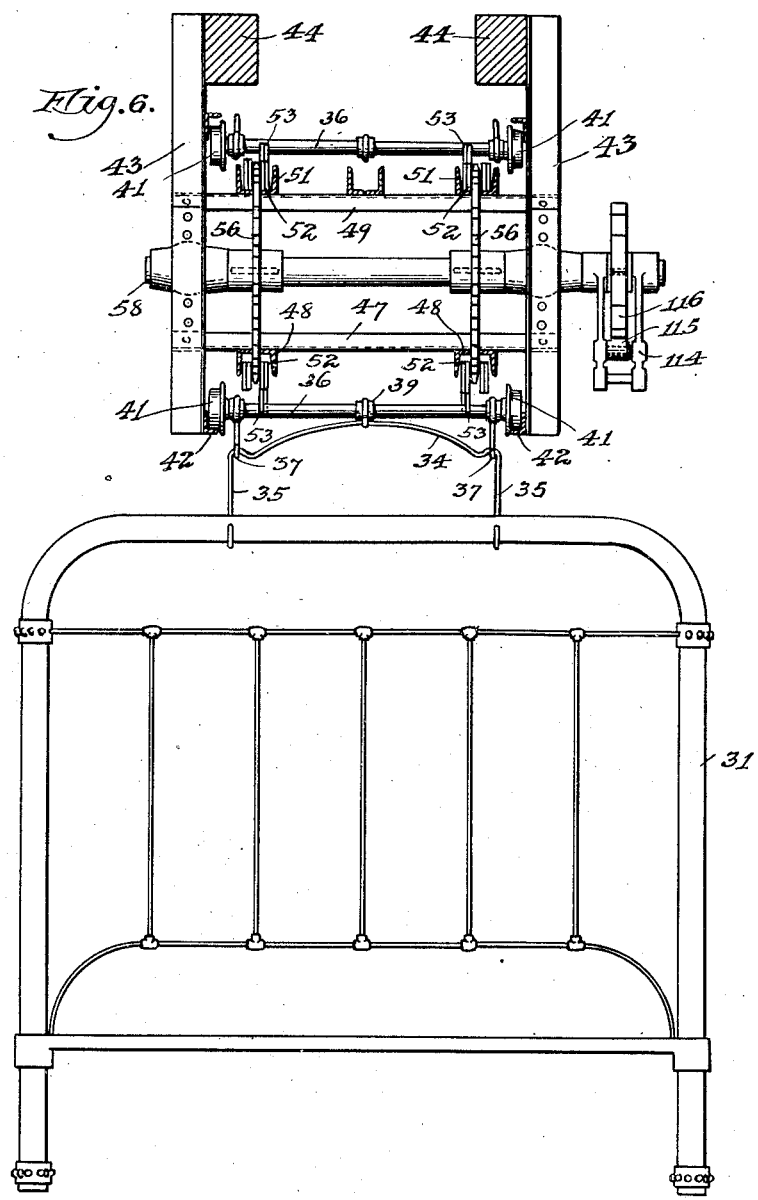

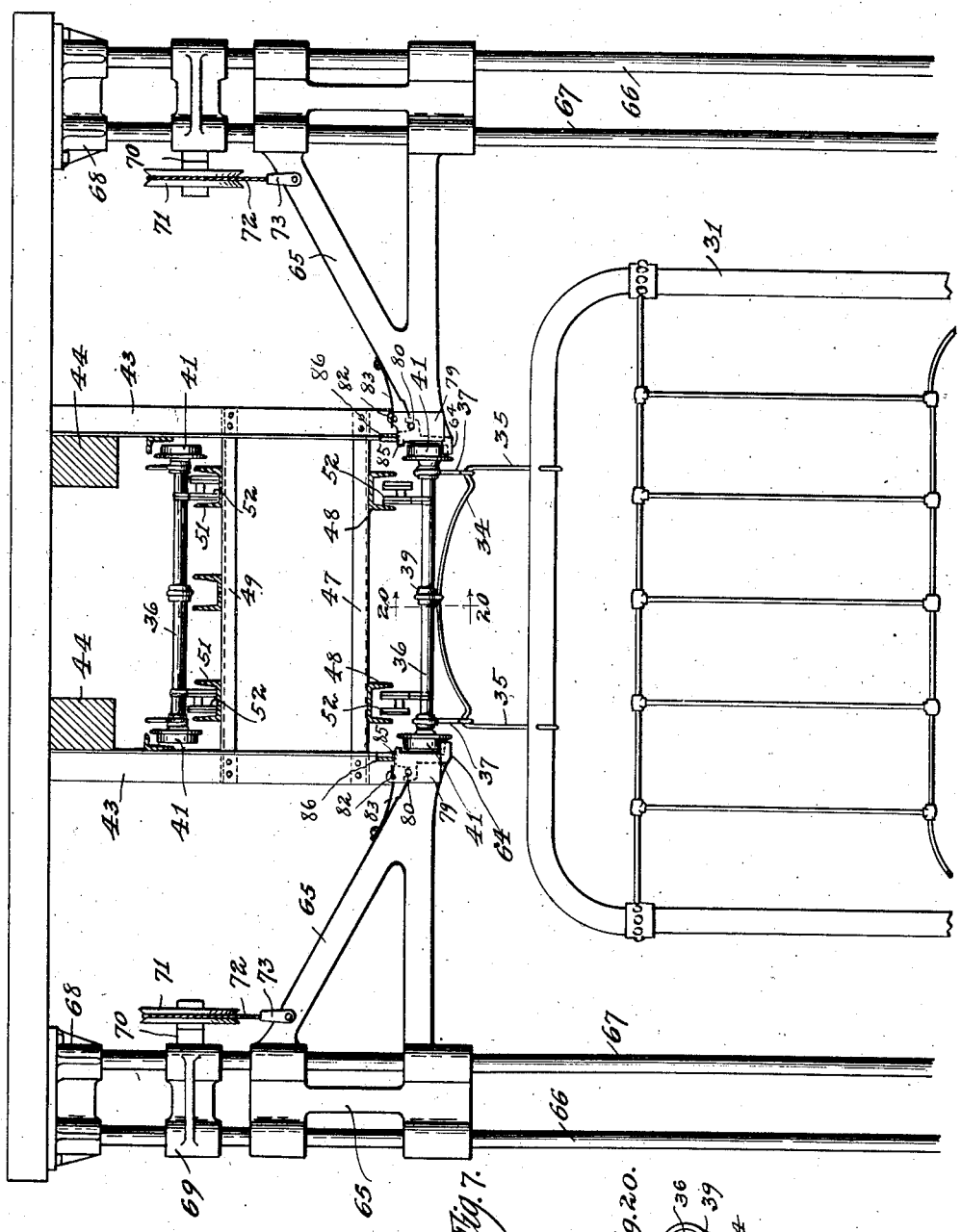

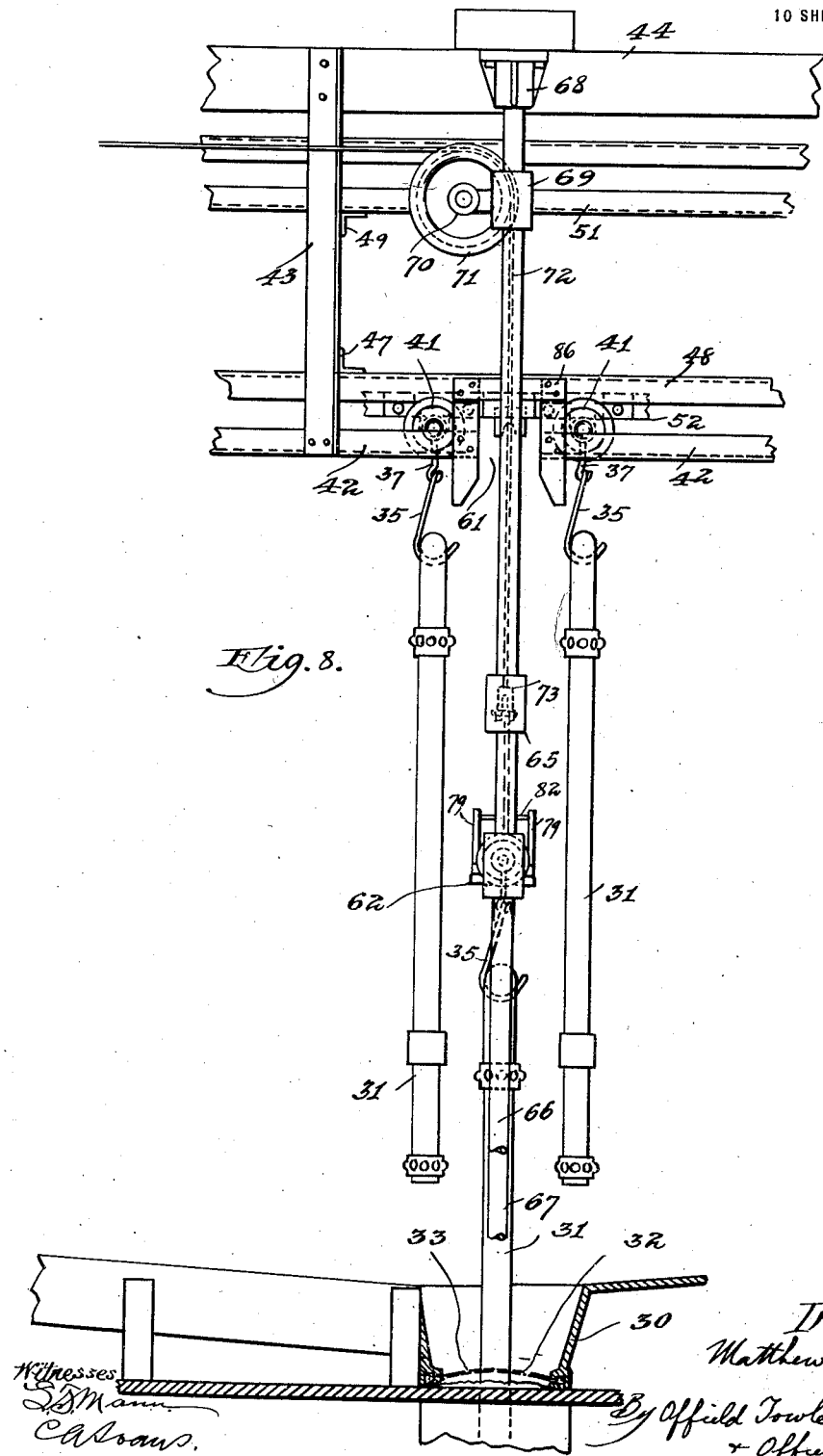

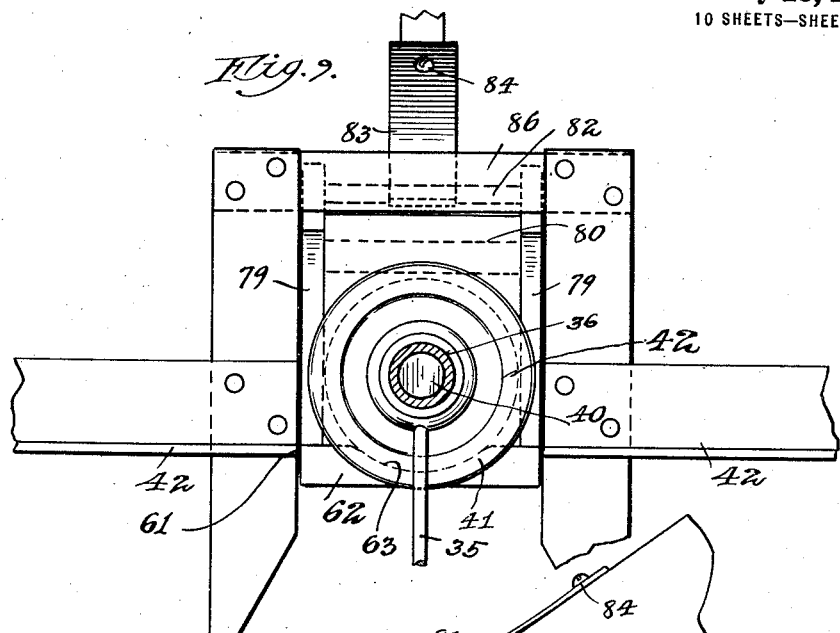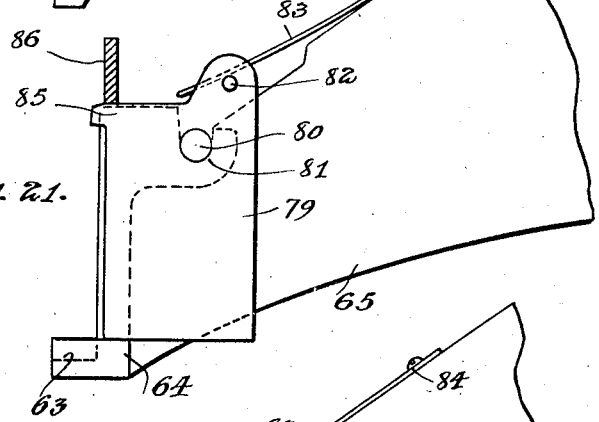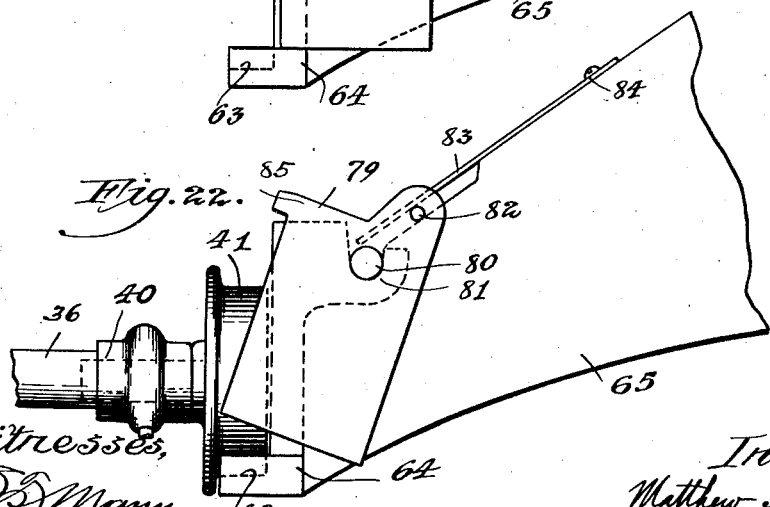

M. F. BAYER.
HANDLING APPARATUS.
APPLICATION FILED DEC. 26, 1917.
1,340,648.
Patented May 18, 1920.
10 SHEETS—SHEET 10.
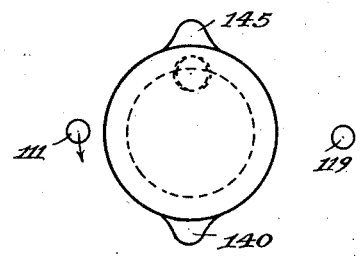
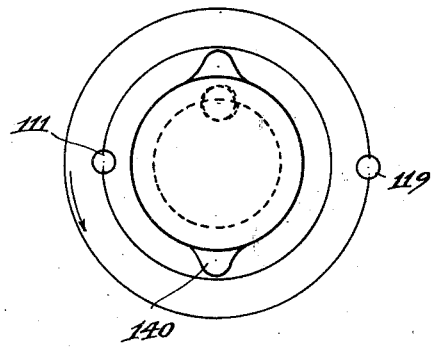
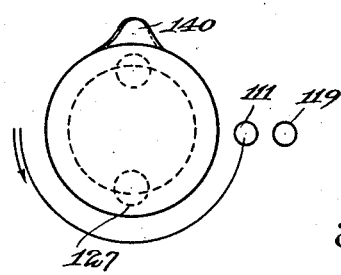
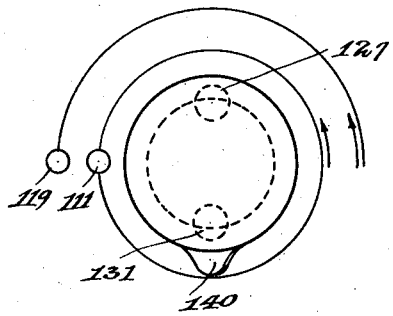
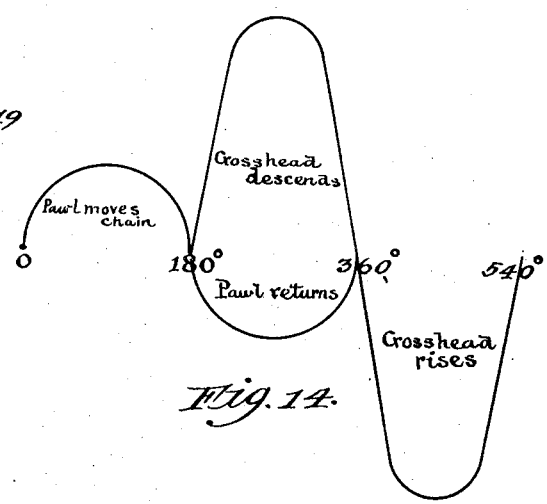

UNITED STATES PATENT OFFICE.

MATTHEW F. BAYER, OF KENOSHA, WISCONSIN, ASSIGNOR TO SIMMONS COMPANY, OF KENOSHA, WISCONSIN, A CORPORATION OF DELAWARE.

HANDLING APPARATUS.

1,340,648.     Specification of Letters Patent.     Patented May 18, 1920.

Application filed December 26, 1917. Serial No. 208,793.

*To all whom it may concern:*

Be it known that I, MATTHEW F. BAYER, a citizen of the United States, residing at Kenosha, in the county of Kenosha and State of Wisconsin, have invented certain new and useful Improvements in Handling Apparatus, of which the following is a specification.

My invention relates to improvements in handling apparatus, and is particularly well adapted for use in connection with the application of surface coatings to large articles, such as metal bedstead ends and the like.

Among the salient objects of the invention are, to provide apparatus of such character that articles may be automatically subjected to treatment without manual manipulation; to provide apparatus of the class described in which the articles may be passed through the apparatus in a continuous series, although treated intermittently; to provide an apparatus of the class described in which a series of articles are automatically arrested for successive treatment when they enter the treating zone; to provide apparatus of the class described requiring a minimum of manual attention and into which articles may be rapidly and conveniently supplied to or removed from the apparatus; to provide an apparatus of the class described in which a temporary shortage of the untreated articles does not result in a loss in the period of effective operation of the machine, and, similarly, in which a temporary piling up of treated articles after passing through the apparatus does not result in enforced stoppage of the apparatus; to provide apparatus for handling and treating articles, so organized that the period and character of the treatment are automatically uniform for each article treated; to provide a construction which shall be simple in design, economical to manufacture, and inexpensive to operate and maintain; and, in general, to provide an improved apparatus of the character referred to.

Broadly stated, the apparatus contemplates the provision of a conveyer for moving a series of articles, the arrangement being such that at a predetermined point in the travel of said conveyer one or more of the articles carried thereby is automatically projected from the conveying field into the zone of treatment. After such treatment, the article is returned into the conveying field and subsequently removed. As a particular application of my invention, I have shown a form of handling apparatus primarily designed for dipping bedstead end frames.

In the drawings which accompany this application—

Figure 1 is a front side elevation of the power end of the apparatus;

Fig. 2 is a side elevation of the idler end of the apparatus;

Fig. 3 is a rear side elevation, looking from the back of Fig. 1;

Fig. 4 is a plan view of certain clutch mechanism and associated parts;

Fig. 5 is a broken-out vertical section of the clutch mechanism shown in Fig. 4;

Fig. 6 is an end elevation of the conveyer showing an article suspended therefrom;

Fig. 7 is an end elevation of the conveyer and associated parts, including the lowering mechanism;

Fig. 8 is a side elevation of the lowering mechanism;

Fig. 9 is a side elevation of a safety device associated with the lowering mechanism;

Figs. 10, 11, 12, 13, and 14 represent diagrammatically various cycles of movement of the clutch mechanism;

Fig. 15 is a section taken on the line 15—15 of Fig. 3;

Fig. 16 is a side elevation of a portion of the conveyer chain;

Fig. 17 is a plan view of the parts shown in Fig. 16;

Fig. 18 is a section taken on the line 18—18 of Fig. 5;

Fig. 19 is a section taken on the line 19—19 of Fig. 5;

Fig. 20 is a section taken on the line 20—20 of Fig. 7;

Fig. 21 is an end view of a portion of the safety mechanism shown in Fig. 9; and Fig. 22 is a view similar to Fig. 21, but showing the safety mechanism in a different position.

Referring to the figures, in Fig. 8, 30 represents the top of a coating tank having a sufficient depth and cross-section to completely accommodate the article to be coated,—in the present instance, a tubular metal bedstead frame end 31. The coating of the bed may preferably be effected by projecting a pair of parallel opposed sheet-like streams 32 and 33 through which the bed frame is lowered. Such a coating device as I have described is disclosed in the pending application of Edward C. Alleman, Serial No. 86,337, filed March 24, 1916, Method of and apparatus for applying liquid coating.

Each bed frame is hung upon a bail member 34 (see also Figs. 6 and 7) having a pair of depending hooks 35 for engaging the transverse tubular top of the bed frame. Said bail 34 is itself suspended from the ends of a hollow axle frame 36 by means of a pair of hooks 37 cast on the ends of the pipe 36. To prevent relative movement of the two sets of hooks 35 and 37, the upper cross member of the bail 34 is bowed slightly so as to resiliently fit within a notch 38 in a hub 39 cast centrally upon the pipe 36 as shown in Fig. 20. To release the bail member 34 in order to facilitate the cleaning thereof when it is desired to make a change in the coating fluid, the bail 34 is sprung down out of the notch 38, after which it may be removed from the hooks 37 in an obvious manner.

In the ends of the hollow axle member 36 there is securely fixed a pair of short pins 40 projecting outwardly to form journals for the trolley wheels 41, said trolley wheels 41 being adapted to roll upon a pair of spaced apart angle-iron track members 42. Said track members 42 are riveted to a series of pairs of vertical angle irons 43, the upper ends of which are bolted to a pair of stringers 44 hung from the ceiling of the paint shop by suspension bolts 45.

Above the lower tracks 42 there are secured to vertical members 43 a series of spaced apart cross-pieces 47, to the lower sides of which are secured inverted channels 48. Above the cross-pieces 47, a second series of other suitable cross-pieces 49 are also secured to the verticals 43, and upon said cross-pieces 49 are secured another pair of channel irons 51 directly above the inverted channels 48. The said pairs of channels 48 and 51 constitute troughs in which run the conveyer chains 52, each link section of the chains having riveted thereon a fork-shaped projection 53 adapted to straddle one end of the axle tube 36. While the trolleys are returning on the upper or back stretch of the chain, they are supported and engaged by the upper surface of the link chains 52.

The opposite ends of the endless conveyer chains 52 are trained around pairs of sprockets 56 and 57, the sprockets 57 being simply idlers, whereas the sprockets 56 are keyed to a shaft 58 intermittently rotated by mechanism to be hereinafter described. It is understood that suitable means, for instance, adjusting screws 59 and blocks 60, are provided at the idler end of the chain in order to take up any slack which may be present or which may develop, due to wear of the conveyer chain.

Describing the particular means associated with the dipping tank by which each bed end as it reaches a position above the tank is lowered thereinto, it will be observed, by referring to Figs. 8 and 9, that immediately above the dipping tank 30 there is a break or gap 61 in the continuity of each of the track rails 42, said gap 61 being normally filled by means of a short track section 62 (see Fig. 9). Said short track section 62 is formed with a rounded depression 63 for receiving the trolley wheel 42, and forms part of the inwardly projecting end 64 of the cross-heads 65 located on each side of the conveyer chain and capable of vertical sliding movement upon a pair of spaced apart guides 66 and 67 which, in the present instance, take the form of shafting having their upper ends seated in fixed cap pieces 68 and having their lower ends suitably secured to the floor of the paint shop. Above the cross-heads 65 and to the guides 66 and 67 is secured a pair of castings 69 formed with inwardly projecting bosses 70 upon which are rotatably mounted sheaves 71. Cables 72 are secured to the cross-heads 65 by sockets 73 and are trained over the sheaves 71 from which they extend in a horizontal direction to a pair of winding drums 74 on opposite sides of the conveyer chain and are keyed to a shaft 75. On each end of the shaft is also keyed a third drum 74ª accommodating a cable 76, on the lower end of which is suspended a counterweight 77 contained within a vertical guide tube 78. The shaft 75 is intermittently driven by mechanism to be described later.

Going back to the details of the lowering apparatus, it will be observed that on the inwardly projecting end of each cross-head 65 there is mounted a pair of guard plates 79 spaced apart to inclose the end of the cross-head and connected by a pivot pin 80 capable of pivotal movement in an open bearing 81. A second pin 82, also extending between the two plates 79, is engaged upon its upper side by means of a flat plate spring 83 secured to the top edge of the cross-head 65 by a screw 84 and normally tending to rotate said plates 79 into the position shown in Fig. 22. When the cross-heads 65 are in their upper position, as shown in Figs. 9 and 21, the upper corners 85 of the plates 79 are engaged by the lower edge of the longitudinal tie-piece 86 extending across the gap in the track rails 42, and are forced to occupy the vertical position shown in Figs. 7, 9, and 21. It will be observed that when the cross-head is in its upper position, the plates 79 do not obstruct the movement of the trolleys into or out of the gap in the track rails, but as soon as the cross-head commences to descend and lower the particular trolley which occupies the gap, the plates 79 at once spring into the position shown in Fig. 22 and positively prevent danger of the trolley wheels jumping out of the depression 63, due to vibration or other causes. Thus, there is no possibility of disarranging the apparatus or dropping a bed frame by reason of a trolley becoming unshipped from the lowering mechanism.

Describing the power-driven actuating mechanism for the apparatus, 87 is a platform suspended from the ceiling of the paint shop by suitable rods 88, said platform supporting an electric motor 89, with its associated gearing. Describing said gearing, 90 is a pinion keyed to the projecting end of the motor shaft and meshing with a large spur gear 91 keyed to a worm shaft 92 rotatably mounted in a housing 93. The worm 94 keyed to the worm shaft 92 coöperates with a worm wheel 95 which is keyed to a transverse intermediate shaft 96 also rotatably mounted in the housing 93.

On the ends of the intermediate shaft 96 there is keyed a pair of clutch disks 97 and 98 which, through mechanism to be presently described, drive a pair of short stub shafts 99 and 100 rotatably supported in journal boxes 101 and 102 bolted to opposite sides of the platform 87. The shaft 99 acts as a foundation for the built-up structure, consisting of the inner sleeve 103, outer sleeve 104, which actually constitutes the journal of the structure, the companion clutch collar 105, and the crank disk 106. All of said parts 99, 103, 104, 105, and 106 are securely keyed together so that they rotate in the bearing 101 as a single element. The stub shaft 100 is part of a similar built-up structure comprising the inner sleeve 107 to which are keyed the outer sleeve 108, the clutch collar 109, and the crank arm 110.

As shown in Fig. 3, the crank disk 106 has a crank pin 111 which accommodates one end of a connecting link 112, the other end of the said link 112 being pivotally connected to a pin 113 on the end of an oscillatory arm 114 loosely mounted on the end of the shaft 58. Said arm 114 carries a spring-pressed pivotally mounted pawl 115 which coöperates with the teeth of a ratchet wheel 116 which is keyed to the said shaft 58. Retrograde movements of the shaft 58 are prevented by means of a detent 117 carried by the end of a spring lug 118. By referring to Fig. 3, it will be manifest that a half revolution of the crank disk 106 will move the ratchet wheel 116 on the shaft 58 one tooth space, and the next half revolution will cause the pawl 115 to be retracted into its original position, as shown in Fig. 3, in order to engage the next tooth of the ratchet wheel. The ratchet wheel has the same number of teeth as the sprocket 57, so that each revolution of the crank disk 106 will advance the trolleys one link space of the conveyer chain.

Referring to Fig. 1, the crank arm 110 has at its outer end a pin 119 to rotatably accommodate one end of a long connecting rod 120, the other end of which is pivotally connected to a boss on the upper side of a rack bar 121 capable of being reciprocated upon a pair of horizontal rods 122 and 123 upon which said rack bar 121 is slidably mounted. The under side of said rack bar 121 is provided with teeth 124 which mesh with the teeth of a pinion 125 keyed to the drum shaft 75. It will be apparent that by reason of the mechanism just described, a rotary movement of the crank arm 110 will result in a to-and-fro oscillatory movement of the drum 74, this resulting in the lowering and raising of the cross-heads 65 which temporarily support the particular bed frame being treated. It must of course be understood that during the lowering and raising of the cross-heads 65 to treat the article, the conveyer must be stationary. Also, during the actuation of the conveyer, the cross-heads 65 must remain quiescent while the trolleys are being advanced one link space so as to permit the removal of the treated article from the zone of the cross-heads and to engage therewith an untreated bed frame.

Special mechanism is employed to actuate the crank disk 106 and the crank arm 110 in properly timed relation, so as to provide the necessary idle periods in the cycles of their movements.

In the clutch collar 105 I drill a cylindrical aperture 126, parallel with the axis of the collar, for slidably receiving a clutch pin 127 which normally tends to move out of said bore 126 and toward the clutch disk 97 under the influence of a strong coiled compression spring 128. In the opposite face of the clutch disk 97 is a pair of diametrically opposed cylindrical depressions 129 and 130 large enough to admit the outer end of the clutch pin 127. The clutch collar 109 is arranged with a similar spring-pressed clutch pin 131 designed to coöperate with clutch holes 132 and 133 in the outer face of the clutch disk 98. The clutch collars 105 and 109 are grooved out, as shown at 134 and 135, to receive at certain periods movable unclutching fingers 136 and 137. As shown in Fig. 4, said unclutching fingers 136 and 137 are pointed at their ends, so that when they are lowered radially into the grooves 134, their points will enter notches 138 and 139 cut in the sides of the pins 127 and 131.

When one of the clutch pins is engaged with a clutch hole in the adjacent clutch disk, the collar and clutch pin revolve with the shaft 96, and if, during said rotation, one of the clutch fingers be dropped into the groove in one of the clutch collars, the rotary movement of the clutch pin will cause it to move rearwardly in its guide aperture against the pressure of its spring, by reason of the wedging action of the point of the stationary clutch finger which enters the notch in the clutch pin. As shown in Fig. 5, the unclutching finger 137 has been lowered into the groove 135 of the collar 109 and the clutch pin 131 has been pulled out rearwardly so as to disengage the clutch disk 98 and arrest the rotation of the shaft 100 and associated parts. As to the stub shaft 99, this is shown connected to the constantly rotating shaft 96 through the clutch pin 127, the unclutching finger 136 being raised into inoperative position.

The movement of each of the unclutching fingers 136 and 137 is controlled by the rotary movement of the clutch collar associated with the opposite unclutching finger. To this end there is formed on the clutch collar 105 a radial cam projection 140 which is adapted to oscillate an arm 141 keyed to the horizontal shaft 142 rotatably supported in suitable bearings parallel with the shaft 96. On the other end of the shaft 142 there is keyed an arm 143 on which is formed the unclutching finger 137, previously described. Normally, the roller 142 runs on the concentric surface of the clutch collar 105, but when it is engaged by the cam projection 140, the arm 141 is raised, thereby raising the unclutching finger 137 carried by the other end of said shaft 142 out of the groove 135, releasing the clutch pin 131. Hence, it will be readily seen that if the clutch collar 105 be rotating with the shaft 96, with the clutch collar 109 stationary, engagement of the cam 140 with the roller 144 will cause the clutch collar 109 to commence a rotary movement. Similarly, the clutch collar 109 is formed with a cam projection 145 coöperating with a roller 146 on the end of a cam arm 147 keyed to a sleeve 148 loosely mounted on the intermediate portion of the shaft 142. The other end of said sleeve 148 carries keyed thereto an arm 149, the end of which constitutes the unclutching finger 136. Hence, when the collar 109 is clutched to the shaft 96, the rotary movement of the cam 145 will operate the arms 147 and 149 and lift the unclutching finger 136 out of the groove 134 and clutch together the collar 105 and the clutch disk 97. By referring to Figs. 18 and 19, it will be observed that the clutch pin 131 is on the same side as, and in line with, the cam 145, whereas, the cam projection 140 is diametrically opposed to the clutch pin 127 on the other clutch collar 105. The purpose of such arrangement is to utilize the idle period corresponding to the retractile movement of the pawl arm 114.

Referring to Figs. 10, 11, 12, 13, and 14,—Fig. 10 represents the condition shown in Figs. 5, 18, and 19, with the shaft 96 clutched to the crank disk 106, thereby enabling it to rotate the crank pin 111 which actuates the conveyer. Fig. 11 shows the condition after the shaft 96 has moved through one-half of a revolution. During said half revolution, the crank pin 111 has also moved through a half revolution, thereby actuating the conveyer for a distance equal to one link space. When the crank pin 111 has reached the position shown in Fig. 11, no further movement of the conveyer takes place, but the pawl advances to move rearwardly. Coincidently with the beginning of the return movement of the ratchet pawl 115, the cam 140 engages the roller 144, thereby lifting the unclutching finger 137 and engaging the shaft 96 with the crank arm 110 and causing the crank pin 119 to rotate. The first half revolution of the crank pin 119 results in the depression of the cross-heads, and at the end of said lowering movement, that is to say, when the shaft 96 has made a whole revolution, as shown in Fig. 12, the clutch pin 127 engages the unclutching finger 136 and the crank pin 111 ceases to rotate. During the next half revolution, the crank pin 119 operates to raise the cross-heads and return to the position shown in Fig. 13, at which time the clutch pin 131, having reached the field of the unclutching finger 137, is withdrawn and the crank pin 119 ceases to rotate. The shaft 96 has thus moved through a complete cycle of five hundred and forty degrees (540°), the mechanism being in the same condition as shown in Fig. 10. Fig. 14 shows the overlapping of the movements of the pawl and the cross-heads.

The herein described structural details may of course be varied or modified considerably, without sacrifice of efficiency and while still remaining within the purview of my invention, the scope of which must be determined by reference to the appended claims.

I claim—

1. In a device of the class described, the combination of a frame, a plurality of carriers movable on the frame, means for intermittently advancing the carriers consecutively along the frame from a receiving position and returning same thereto, and mechanism for withdrawing each carrier from said means and returning same thereto during periods of rest of said advancing means.

2. In a device of the class described, the combination of a frame, a plurality of carriers movable therealong, an endless belt operable on the frame for moving the carriers consecutively in an endless path from a receiving position at one end of the frame and back thereto, and a reciprocating mechanism for consecutively withdrawing each carrier from and returning same to engagement with the belt.

3. In a device of the class described, the combination of an elongated frame, a plurality of carriers movable longitudinally of the frame, an endless belt detachably engaging the carriers to move same consecutively in an endless path from end to end of the frame, and mechanism coöperating with the endless belt to withdraw a carrier from said belt and return same to its former position of engagement with the endless belt.

4. In a device of the class described, the combination of a dipping tank, a longitudinal frame spaced above and extending over the dipping tank, a plurality of article carriers movable lengthwise of the frame, an endless belt adapted to move the carriers in an endless path consecutively along the frame over the dipping tank, and reciprocating mechanism adapted to withdraw and return each carrier directly to and from the endless belt at a point above the dipping tank so as to impart a direct up and down movement to the article on said carrier for immersing same in the dipping tank.

5. In a device of the class described, the combination of a plurality of carriers having means for suspending articles therefrom, mechanism for consecutively advancing said carriers over a treating zone, and vertically reciprocating mechanism for consecutively depressing and elevating each carrier and the article suspended thereon, in a vertical plane at a predetermined point over the treating zone.

6. In a device of the class described, the combination of an elevated frame, a plurality of carriers movable consecutively along the under side of the frame and normally elevated mechanism adapted to be depressed below the frame to successively project the carriers down from and return same to the frame.

7. In a device of the class described, the combination of a longitudinal frame, a plurality of carriers movable along the frame, an intermittently operable endless belt for moving the carriers consecutively step by step in an endless path from end to end of the frame, and means automatically operable at intervals of rest of said belt to consecutively withdraw the carriers from and return same to engagement with the endless belt.

8. In a device of the class described, the combination of a longitudinal frame, a plurality of carriers operable along the frame, an endless belt having means detachably engaging the carriers for moving the latter in an endless path from end to end of the frame, and reciprocating mechanism for consecutively removing each carrier from and returning said carrier to the same position of engagement with the belt.

9. In a device of the class described, the combination of a carrier frame, a plurality of carriers movable along the frame, each comprising a transverse shaft with a supporting wheel at each end, an endless belt adapted to move the carriers consecutively in an endless path from end to end of the frame, said belt being provided with yokes straddling the shaft of each carrier to maintain the latter in a predetermined relative position on the frame, and mechanism for removing and returning each carrier from the frame, and adapted to withdraw the shaft of each carrier from its retaining yokes and return same into engagement therewith.

10. In a device of the class described, the combination of a longitudinal frame, a plurality of carriers movable lengthwise of the frame, an endless belt for removing the carriers consecutively along the frame from a receiving position and returning same thereto and hangers depending from the carriers as the latter move away from the receiving position, and adapted to automatically fold when returning to the receiving position.

11. In a device of the class described, the combination of a frame, a plurality of carriers movable therealong, an endless belt for moving the carriers consecutively in an endless path over a treating zone, and a detachable hanger on each carrier having locking means for holding same in a predetermined position on the carrier.

12. In a device of the class described, the combination of a frame, carrying means movable along the frame, reciprocating mechanism operating in one direction to advance the carriers intermittently along the frame and in the other direction while the carriers remain stationary, and mechanism operating during the latter operation of said reciprocating mechanism to withdraw a carrier from and return same to the frame.

13. In a device of the class described, the combination of a carrier frame comprising a track with a removable section, a plurality of carriers movable intermittently along the track so as to consecutively engage the movable section, means for withdrawing said section with a carrier thereon from the track and returning same thereto, and locking means operable automatically to hold the carrier on said section as the latter is withdrawn and to release the carrier as the section is returned.

14. In a device of the class described, the combination of a carrier for intermittently advancing articles to and from a treating zone, and mechanism for actuating said carrier so as to afford a gradually increasing initial movement and a gradually decreasing final movement thereof.

15. In a device of the class described, the combination of a carrier for moving articles to and from a treating zone, and mechanism for intermittently operating said carrier, comprising a rotatable member eccentrically connected to operate the carrier and afford a gradually increasing initial movement and gradually diminishing final movement thereof.

16. In a device of the class described, the combination of a carrier operated intermittently to advance articles step by step therealong, a reciprocating means for removing the articles from the carrier to a position of treatment and returning same to the carrier, and mechanism for operating said reciprocating means so as to retard the movement thereof at each extremity of the reciprocation thereof.

17. In a device of the class described, the combination of a horizontal track, a series of trolleys for said track provided with means for detachably receiving a series of articles to be subjected to treatment, a chain parallel with said track and provided with forked members detachably engaging and for moving said trolleys, means for intermittently moving said chain, said track being provided with a gap through which one of said trolleys may be lowered to depress an article for treatment, a member constituting a closure for said gap during the movement of the articles under the influence of said chain, and means for lowering said member whereby a trolley temporarily resting thereon may be depressed.

18. In a device of the class described, the combination of a dipping tank, a pair of parallel spaced apart track members arranged in the same horizontal plane and each having a gap in its continuity located above the tank, a series of axially horizontal trolley members adapted to roll upon and along said track and provided with spaced apart wheels capable of passing through said gaps, an intermittently movable chain provided with downwardly facing forks for detachably engaging the trolley members, and closures for said gaps adapted to support and depress a trolley member resting on said closures and lower the same into the dipping tank .

MATTHEW F. BAYER.